(12) United States Patent
Yoshida

(10) Patent No.: US 7,269,716 B2
(45) Date of Patent: Sep. 11, 2007

(54) PROCESSOR TO EFFICIENTLY RENAME DECODED CONDITION CODES AND INSTRUCTION CONTROL METHOD THEREOF

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 453 days.

(21) Appl. No.: 10/347,359

(22) Filed: Jan. 21, 2003

(65) Prior Publication Data

US 2004/0006687 A1 Jan. 8, 2004

(30) Foreign Application Priority Data

Jul. 5, 2002 (JP) ............................. 2002-197307

(51) Int. Cl.
*G06F 15/00* (2006.01)
(52) U.S. Cl. ...................................... 712/216; 712/217
(58) Field of Classification Search ................ 712/220, 712/216, 217
See application file for complete search history.

(56) References Cited

U.S. PATENT DOCUMENTS

| | | | |
|---|---|---|---|
| 5,133,077 A * | 7/1992 | Karne et al. ............... | 712/23 |
| 5,479,622 A * | 12/1995 | Grohoski et al. ........... | 712/215 |
| 5,487,156 A * | 1/1996 | Popescu et al. ............. | 712/217 |
| 5,632,023 A | 5/1997 | White et al. | |
| 5,805,851 A * | 9/1998 | Lotz ........................... | 712/216 |
| 5,805,853 A | 9/1998 | White et al. | |
| 5,838,988 A * | 11/1998 | Panwar et al. ............... | 712/32 |
| 5,974,240 A * | 10/1999 | Chan ........................... | 712/218 |
| 6,049,864 A * | 4/2000 | Liu et al. .................... | 712/214 |
| 6,061,785 A | 5/2000 | Chiarot et al. | |
| 6,708,267 B1* | 3/2004 | Flacks et al. ................ | 712/216 |

FOREIGN PATENT DOCUMENTS

| | | | |
|---|---|---|---|
| JP | 07334364 A | 12/1995 | |
| JP | 09006611 A | 1/1997 | |
| JP | 11296371 A | 10/1999 | |

* cited by examiner

*Primary Examiner*—Donald Sparks
*Assistant Examiner*—Benjamin Geib
(74) *Attorney, Agent, or Firm*—Stass & Halsey LLP

(57) ABSTRACT

A following CC read instruction which is decoded simultaneously with a previous CC update instruction is developed into a multiflow. The first flow is set to a no-operation. A CC renaming update is executed by a CC renaming map update processing unit by the decoding of the previous CC update instruction. The resultant instruction is stored into a CC read instruction multiflow instruction word register. At the next second flow, the CC read instruction is issued from the multiflow instruction word register and, in a state where another instruction is not simultaneously issued, a CC renaming map is referred to by a CC renaming map reference processing unit by the decoding of the CC read instruction.

12 Claims, 12 Drawing Sheets

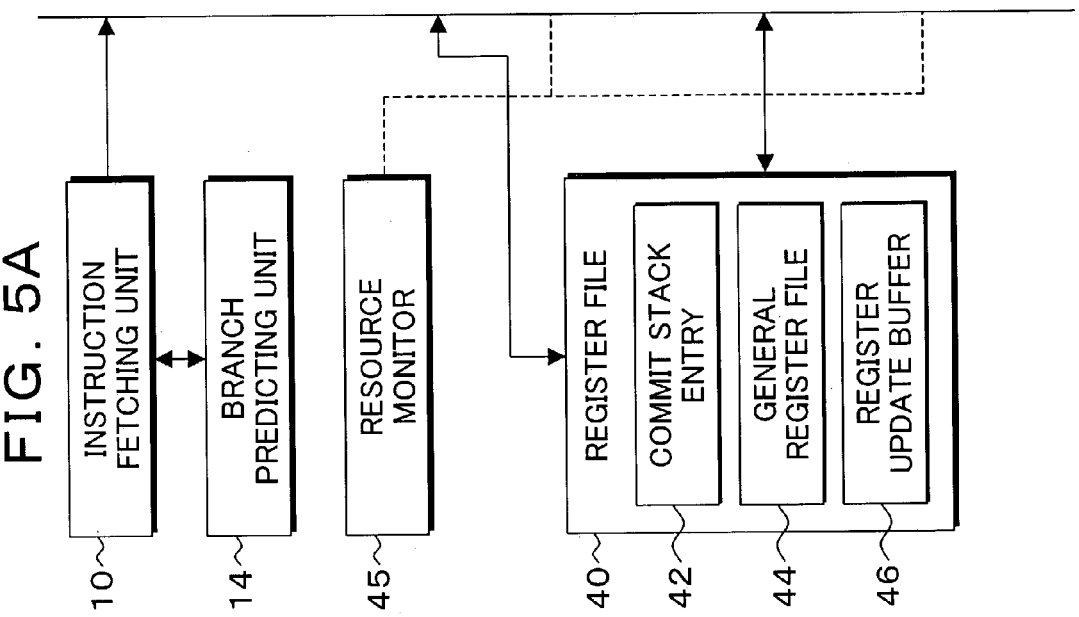
FIG. 5A

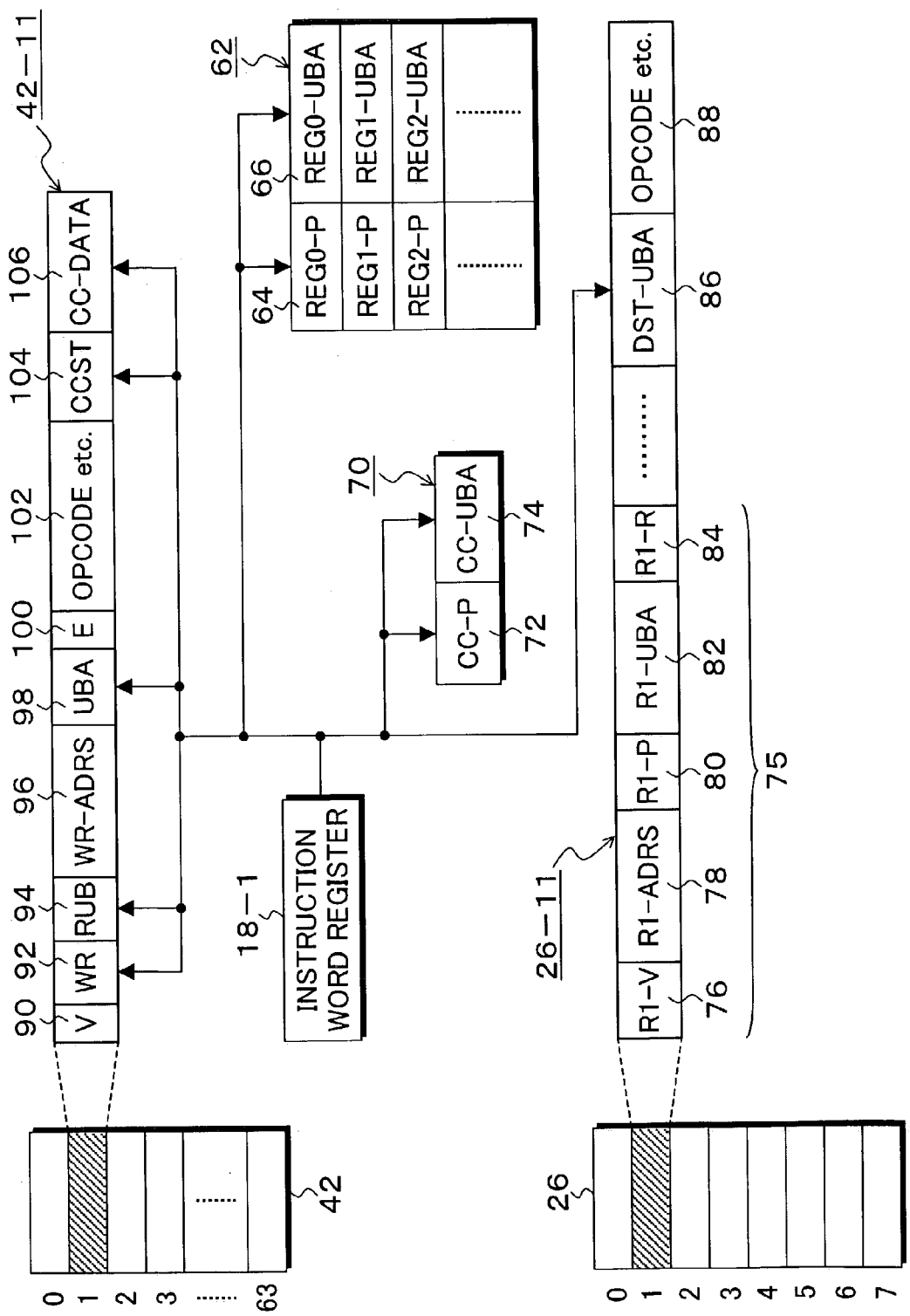

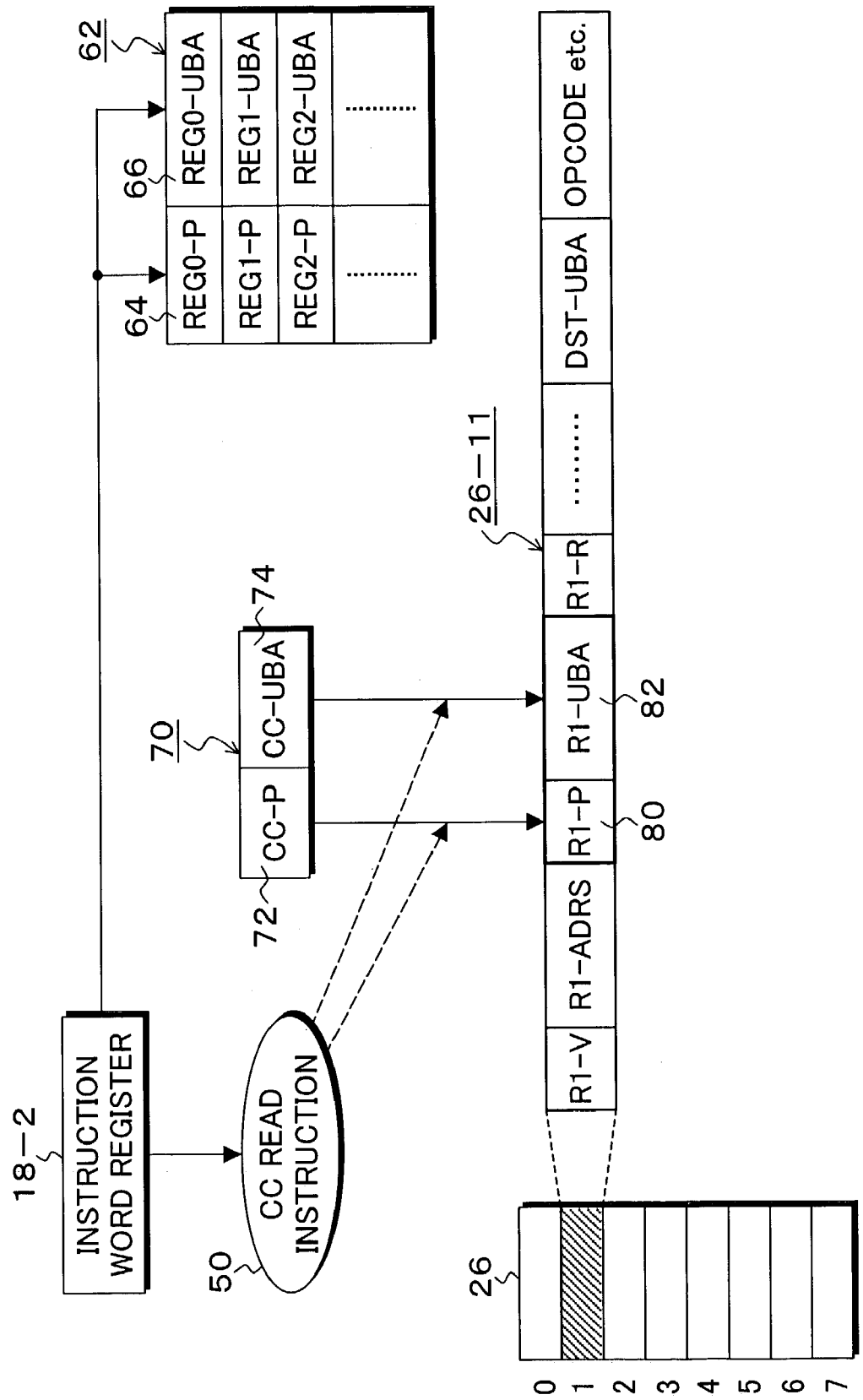

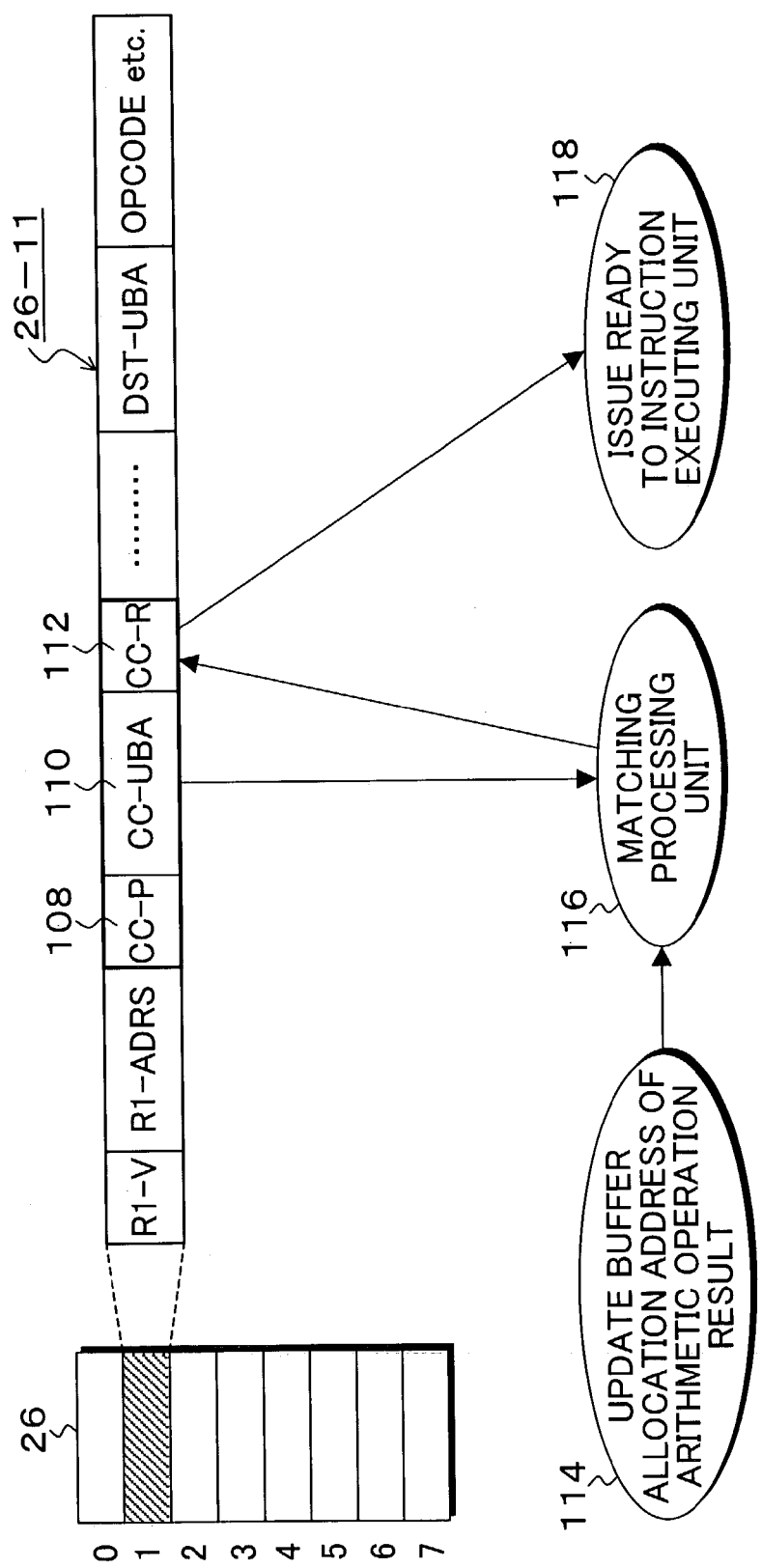

PROCESSOR TO EFFICIENTLY RENAME DECODED CONDITION CODES AND INSTRUCTION CONTROL METHOD THEREOF

BACKGROUND OF THE INVENTION

1. Field of the Invention

The invention relates to a processor and an instruction control method for executing instructions by dynamic pipeline scheduling. More particularly, the invention relates to a processor and an instruction control method for efficiently executing renaming of an update instruction and a read instruction of condition codes which were simultaneously decoded.

2. Description of the Related Arts

Hitherto, in a processor for executing a dynamic pipeline scheduling, processes are executed separately by three units: an instruction issuing unit of in-order depending on program order; an instruction executing unit of out-of-order which does not depend on the program order; and a committing unit of the in-order depending on the program order. That is, the instruction issuing unit fetches a plurality of instructions by the in-order, decodes them, and allows a reservation station to hold the instruction operation (OP code) and an operand. As soon as all operands are prepared in the reservation station and an arithmetic operating unit is made usable, the instruction executing unit speculatively executes the instruction by the out-of-order and obtains a result. The committing unit discriminates a commitment of the instruction on the basis of a branch prediction result or the like, completes the instruction by the in-order, and stores the execution result into a register file or a memory (only in the case of storage). In the processor using such a dynamic pipeline scheduling, in order to keep program order performance of register values, a register update buffer is prepared as a renaming register for holding register update data until completion (commitment) of the instruction. In the processor for simultaneously decoding a plurality of instructions as mentioned above, in renaming in a decoding cycle, it is necessary not only to refer to a renaming map in which renaming histories of up to the previous cycle have been registered but also to rename instructions in consideration of a dependent relation with the instruction before the self instruction among the instructions which were simultaneously decoded. The register renaming is separated into: a renaming map updating process at a decoding stage of the register update instruction serving as a previous instruction; a renaming map referring process at a decoding stage of the register read instruction serving as a following instruction; forward control discrimination at a priority stage of the previous instruction; and a register writing process at an updating stage of the previous instruction. Particularly, when the register update instruction and the register read instruction are simultaneously decoded, it is necessary to rename the register read instruction in consideration of the dependent relation with the register update instruction before the self instruction. Specifically speaking, there is executed forward control such that when the renaming register is update-pending and the value is referred to by the register read instruction from an arithmetic operating unit or the renaming register, an address number of the renaming register and an address number of a source register registered in a reservation station are compared at timing of writing an arithmetic operation result of the previous register update instruction, thereby inputting an execution result of the previous register update instruction into an executing stage of a following register referring instruction and allowing the instruction to be executed.

FIG. 1 is an explanatory diagram of the renaming map updating process in the case where, with respect to the previous register update instruction and the following register read instruction which were simultaneously decoded, a register is allocated onto a register update buffer at the decoding stage of the previous register update instruction. According to such a process, at the decoding stage including the register update instruction and the register read instruction, a dedicated register which holds register update data until an execution result of the instruction is committed is allocated onto the register update buffer (not shown). That is, with respect to four instructions of instruction word registers 218-1 to 218-4, four buffers are allocated onto the register update buffer and information regarding the allocation buffers is held in a renaming map 262. It is now assumed that the register update instruction has been fetched into the instruction word register 218-1 and a next register read instruction has been fetched into the instruction word register 218-2. The renaming map 262 has a pending bit 264 and an allocation address 266. The pending bit 264 is set for each of the allocation registers allocated in correspondence to the four instructions. A relation between a general register REG and an allocation address UBA in the update buffer has been registered as an allocation address 266. Simultaneously with the decoding of the four instructions in the instruction word registers 218-1 to 218-4, for example, as shown with respect to the register update instruction of the instruction word register 218-1, an allocation entry 226-11 corresponding to the instruction is held in a reservation station 226 and an allocation entry 242-11 corresponding to the instruction is held also in a commit stack entry 242. The allocation entry 242-11 in the commit stack entry 242 is constructed by areas of: a valid bit 290; a write register allocation bit 292; a register update buffer allocation bit 294; a write register address 296; an update buffer allocation address 298; an arithmetic operation completion wait bit 300; an instruction operation 302 such as an OP code or the like; a condition code register write bit 304; and condition code data 306. Simultaneously with the allocation corresponding to the instruction of the allocation entry 242-11, bit setting of the write register allocation bit 292, bit setting of the register update buffer allocation bit 294, and writing of the allocation address into the update buffer allocation address 298 are executed in a decoding cycle of the instruction. Subsequent to a first source register area 275 and a second source register area 285, a destination update buffer allocation address 286 and an instruction operation 288 such as an OP code or the like are stored in the allocation entry 226-11 corresponding to the register update instruction held in the reservation station 226. The first source register area 275 is provided with: a first source valid bit 276; a first source register address 278; a first source pending bit 280; a first source register update buffer allocation address (hereinafter, referred to as an "R1 update buffer allocation address") 282; and a bypass ready bit (forward ready bit) 284. Although areas similar to those in the first source register area 275 are provided for the second source register area 285 as well, they are not shown. In the following explanation and on the drawings, the first source register is expressed as an abbreviation R1 and the second source register is expressed as an abbreviation R2.

FIG. 2 is an explanatory diagram in the case where the following register read instruction which has been fetched in the instruction word register 218-2 and simultaneously decoded refers to the renaming map 262 updated in FIG. 1.

Assuming that the instruction in the instruction word register 218-2 is the following register read instruction, the following instruction refers to the renaming map 262 by an address of the register serving as a reading source, for example, by an address "REG0" and refers to the first source register address 278 and the R1 update buffer allocation address 282 in the allocation entry 226-11 of the previous instruction in the reservation station 226 by the pending bit 264 and the allocation address 266. Forward control to a following instruction as shown in FIG. 3 can be made by referring to an execution result of the previous instruction.

According to the forward control to the following instruction in FIG. 3, an R1 update buffer allocation address 314 obtained from the execution result of the previous register update instruction and the R1 update buffer allocation address 282 in the allocation entry 226-11 obtained with reference to the renaming map 262 by the following register read instruction in FIG. 2 are compared, for example, by a matching processing unit 316 at a priority stage of the previous instruction, and if they coincide, the bypass ready bit 284 in the allocation entry 226-11 is set. If a bypass ready to the following instruction, that is, a forward ready is determined from the execution result of the previous instruction as mentioned above, like a process 318, the instruction executing unit is notified of completion of the preparation on the basis of the bypass ready bit 284, the execution result of the previous instruction is forwarded before the commitment, and the following instruction is executed.

In a processor using an SPARC instruction architecture, there is a case where a condition code (hereinbelow, referred to as "CC") is updated as source data by an update instruction and, thereafter, it is read out by the read instruction and forward control is made. A code indicative of a state of the execution result of a numerical value arithmetic operating instruction such as negative, zero, overflow, or carry is used as such a condition code CC. Also with respect to the instruction for updating the CC register and referring to it as mentioned above, in a processor for simultaneously decoding a plurality of instructions, in the CC renaming in the decoding cycle, it is necessary to not only refer to a CC renaming map in which CC renaming histories of up to the previous cycle have been registered but also perform the CC renaming in consideration of a dependent relation with the instruction before the self instruction in the instructions which were simultaneously decoded. Also, with respect to the instruction which updates the CC register and refers to it, in order to execute the instructions by an out-of-order, a CC register update buffer is prepared as a renaming register for holding update data of the CC register until the commitment.

FIG. 4 is an explanatory diagram of the decoding stage of the CC update instruction in the renaming of the CC register with respect to the previous CC register update instruction of the instruction word register 218-1 and the following CC register read instruction of the instruction word register 218-2 which were simultaneously decoded. A construction of FIG. 4 is fundamentally the same as that in the case of the register update instruction in FIG. 1. That is, by the decoding of the CC update instruction in the instruction word register 218-1, the buffer is allocated onto the register update buffer and information regarding such an allocation buffer is held in a CC renaming map 320. A CC pending bit 322 and an allocation address 324 have been registered in the CC renaming map 320. Simultaneously with the decoding of the CC update instruction in a instruction word register 218, the allocation entry 226-11 corresponding to the instruction is held in the reservation station 226 and an allocation entry 242-11 corresponding to the instruction is also held in the commit stack entry 242. In the allocation entry 226-11 in the reservation station 226, a CC source register area 334 is added subsequently to the first source register area 275. A CC source register area is also added with respect to a second source register area (not shown). A CC pending bit 326, a CC update buffer allocation address 328, a CC bypass ready bit (forward ready bit) 330, and a CC data area 332 are provided in the CC source register area 334. Subsequently, the CC renaming map 320 is referred to by the address of the register serving as a reading source in response to the CC register read instruction of the instruction word register 218-2, the CC pending bit 326 and CC update buffer allocation address 328 in the allocation entry 226-11 of the previous instruction of the reservation station 226 are referred to by the CC pending bit 322 and the allocation address 324, and forward control to the following CC register read instruction is made. In the forward control, the update buffer allocation address obtained from the execution result of the previous CC register update instruction and the CC update buffer allocation address 328 in the allocation entry 226-11 obtained with reference to the CC renaming map 320 by the following register read instruction are compared by a matching process, for example, at a priority stage of the previous instruction. If they coincide, the CC bypass ready bit 330 in the allocation entry 226-11 is set if the CC bypass ready, that is, the forward ready to the following instruction is determined from the execution result of the previous instruction as mentioned above, the instruction executing unit is notified of completion of the preparation on the basis of the CC bypass ready bit 330, the execution result of the previous instruction is forwarded before the commitment, and the following instruction is executed.

In the processor which simultaneously decodes a plurality of instructions, however, in the renaming in the decoding cycle, it is necessary to not only refer to the renaming map in which renaming histories of up to the previous cycle have been registered but also perform the renaming in consideration of the dependent relation with the instruction before the self instruction in the instructions which were simultaneously decoded. In the CC renaming, therefore, only after the complicated instruction decoding processes are executed with respect to both of the CC update instruction and the CC read instruction, the discrimination can be made and the execution of the CC renaming among the instructions which were issued simultaneously becomes a bottleneck in a processor which intends to operate at a high frequency. If the CC source area is provided only for the condition code in which a frequency of instructions is low with respect to the allocation entry of the reservation station, a problem such that resources are increased more than they are needed is also caused.

SUMMARY OF THE INVENTION

According to the invention, there are provided a processor and an instruction control method, in which with respect to a previous CC update instruction and a following CC read instruction which have simultaneously been decoded and have a dependent relation, simultaneous CC renaming is avoided and an operating frequency can be raised.

According to the invention, there is provided a processor comprising: an instruction issuing unit which issues fetched and decoded instructions by an in-order; an instruction executing unit which executes instructions held in a reservation station by an out-of-order; and a committing unit which discriminates a commitment of the instructions executed by the instruction executing unit and completes them by the in-order. The processor according to the invention comprises: an instruction fetching unit; a CC renaming map update processing unit; a renaming map reference processing unit; and a condition data write processing unit. The instruction fetching unit simultaneously fetches a plurality of instructions including a CC update instruction serving as a previous instruction and a CC read instruction serving as a following instruction into the instruction issuing unit. At a decoding stage D1 of a CC update instruction (previous instruction), when a renaming register which holds update data until the commitment of the instruction is allocated, the CC renaming map update processing unit registers condition code information including a register number of the renaming register into a CC renaming map. The renaming map reference processing unit develops the CC read instruction (following instruction) into a multiflow, transfers and holds the multiflow instruction into a multiflow instruction word register by setting the same decoding stage as that of the CC update instruction (previous instruction) to a no-operation, and at the next decoding stage of the CC read instruction (following instruction), stores the condition code information of the CC update instruction (previous instruction) registered in the CC renaming map into a first source register area of a previous instruction allocation entry 1 stored in the reservation station. At a priority stage of the CC update instruction (previous instruction), a bypass control discriminating unit (forward control discriminating unit) compares the renaming register number of the execution result with the renaming register number in the previous instruction allocation entry in the reservation station, and when they coincide, notifies the instruction executing unit of completion of preparation for forward control of condition data for the following instruction and allows the instruction executing unit to execute the instruction. At an updating stage of the previous instruction, the condition data write processing unit stores condition code data obtained as an execution result of the CC update instruction (previous instruction) into the first source register area of the previous instruction allocation entry 1 in the reservation station. As mentioned above, according to the invention, the CC read instruction which needs to be renamed is developed into a multiflow in consideration of a dependent relation with the instruction before the self instruction in the CC update instruction and the CC read instruction which were simultaneously decoded. The first flow which can be issued simultaneously with the previous CC update instruction is set to no-operation and the multiflow instruction is stored into the multiflow instruction word register. In the subsequent second flow in which another instruction is not simultaneously issued, the CC read instruction in the multiflow instruction word register is decoded and the renaming map to read out the CC is referred to. Therefore, by executing the CC renaming in order while separating into two decoding stages with respect to the CC update instruction and the CC read instruction which are simultaneously fetched and decoded, the simultaneous CC renaming can be avoided and an operating frequency of the processor can be raised. A dedicated area which is necessary for bypass control of the condition code is not provided in the entry allocated to the reservation station in correspondence to the update instruction of the condition code, but an ordinary register operand area is used in common and the condition code information is stored, so that there is no need to newly increase resources.

The CC renaming map update processing unit stores an update pending bit into the renaming map for the condition code together with the register number of the renaming register allocated to the condition code update instruction. The CC renaming map reference processing unit stores the CC update pending bit of the previous instruction registered in the CC renaming map and a CC update buffer allocation address (register number) 74 of the renaming register for the condition code into the area for the update pending bit of the source register in the previous instruction allocation entry of the reservation station and the renaming register number. The bypass control discriminating unit (forward control discriminating unit) compares a renaming address number of the execution result of the previous instruction with the renaming register number in the previous instruction allocation entry in the reservation station under a condition that the CC update pending bit has been set to 1. When they coincide, a bypass ready bit for the condition code is set into a bypass ready area of the source register in a previous instruction allocation entry 26-11 in the reservation station. The instruction executing unit is notified of the completion of the preparation for the forward control of the condition data for the following instruction on the basis of the bypass ready bit for the condition code. The condition data write processing unit stores the condition data obtained as an arithmetic operation result of the previous instruction into the source register area subsequent to the condition code update pending bit, the address number of the renaming register for the condition code, and the bypass ready bit for the condition code in the previous instruction allocation entry 26-11 stored in the reservation station.

According to the invention, there is provided an instruction control method of a processor, comprising:

an instruction issuing step wherein instructions which were fetched and decoded are issued to a reservation station by an in-order;

an instruction executing step wherein the instructions held in the reservation station are executed by an out-of-order;

a committing step wherein a commitment of the instructions executed in the instruction executing step is discriminated and the instructions are completed by the in-order;

an instruction fetching step wherein a plurality of instructions including a CC update instruction serving as a previous instruction and a CC read instruction serving as a following instruction are simultaneously fetched into an instruction issuing unit;

a renaming map updating step wherein at a decoding stage of a condition code update instruction serving as a previous instruction, when a renaming register which holds update data until the commitment of the instruction is allocated, condition code information including a register number of the renaming register is registered into a renaming map for the condition code;

a renaming map referring step wherein the following instruction is developed into a multiflow, the multiflow instruction is transferred and held into a multiflow instruction word register by setting the same decoding stage as that of the previous instruction to a no-operation, and at the next decoding stage of the following instruction, condition code information of the previous instruction registered in the renaming map for the condition code is stored into a source register area in a previous instruction allocation entry stored in the reservation station;

a forward control discriminating step wherein at a priority stage of the previous instruction, a renaming address number of an execution result is compared with a renaming register number in the previous instruction allocation entry in the reservation station, and when they coincide, an instruction executing unit is notified of completion of preparation of forward control of condition data for the following instruction and is allowed to execute the instruction; and a condition data writing step wherein at an update stage of the previous instruction, condition code data obtained as an execution result of the previous instruction is stored into the source register area in the previous instruction allocation entry stored in the reservation station.

Details of the instruction control method are fundamentally the same as those in the case of the processor.

The above and other objects, features, and advantages of the present invention will become more apparent from the following detailed description with reference to the drawings.

BRIEF DESCRIPTION OF THE DRAWINGS

FIGS. 5A and 5B are block diagrams of a hardware construction of a processor according to the invention for making storage control of CC data into a reservation station;

FIG. 8 is an explanatory diagram of an updating process of a CC renaming map according to the invention;

FIG. 9 is an explanatory diagram of a referring process of the CC renaming map according to the invention;

FIG. 10 is an explanatory diagram of a discriminating process of forward control of the CC data according to the invention.

DETAILED DESCRIPTION OF THE PREFERRED EMBODIMENT

Figure 5B:
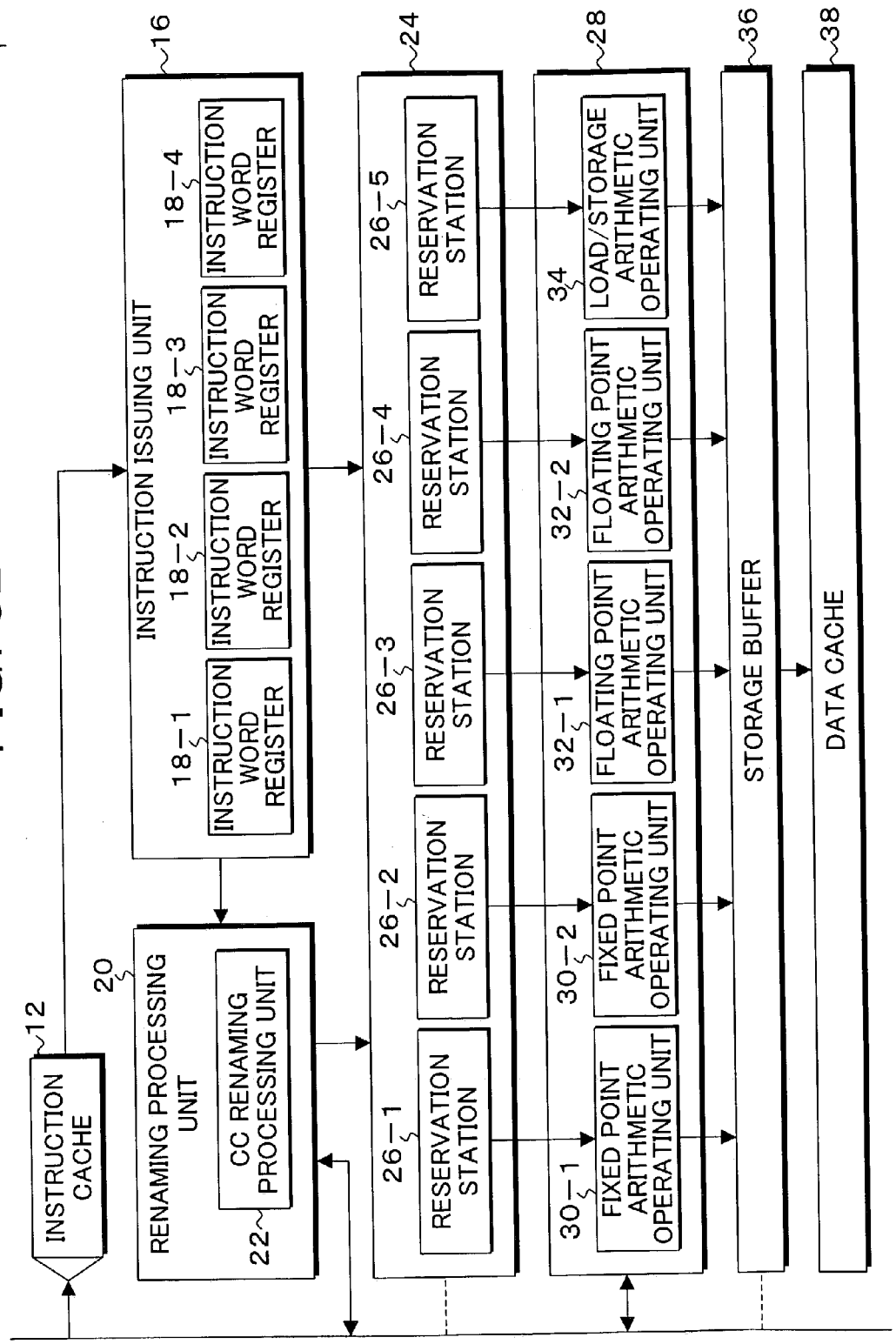

FIGS. 5A and 5B are block diagrams of a hardware construction of a processor for making instruction control according to the invention in which instructions are executed by dynamic pipeline scheduling and CC data is stored into a reservation station. The processor comprises: an instruction fetching unit 10; a branch predicting unit 14; an instruction cache 12; an instruction issuing unit 16; a renaming processing unit 20; a reservation station processing unit 24; an instruction executing unit 28; a storage buffer 36; a data cache 38; a register file 40; and a resource monitor 45. Four instruction word registers 18-1 to 18-4 are provided for the instruction issuing unit 16. Four instructions including a CC update instruction and a CC read instruction as a target of the invention are simultaneously fetched and decoded. Reservation stations 26-1 to 26-5 are provided for the reservation station processing unit 24. Fixed point arithmetic operating units 30-1 and 30-2, floating point arithmetic operating units 32-1 and 32-2, and a load/storage arithmetic operating unit 34 are provided for the instruction executing unit 28. The register file 40 has: a commit stack entry 42; a general register file 44 known as an architecture register file; and a register update buffer 46 serving as a target of register allocation of the renaming processing unit 20. A CC renaming processing unit 22 for making storage control of CC data into the reservation station according to the invention is provided for the renaming processing unit 20. The CC renaming processing unit 22 assures an allocation buffer as a CC renaming register onto the register update buffer 46 at a decoding stage of the CC update instruction serving as a previous instruction and forms a CC renaming map. With respect to the CC read instruction serving as a following instruction, it is developed into a multiflow. In the instruction operation of the same previous flow as that of the decoding stage of the previous CC update instruction, the CC read instruction is stored into a multiflow instruction word register as an NOP (no-operation). At the decoding stage of the CC read instruction from the multiflow instruction word register by the next instruction operation of the following flow, CC information of the CC renaming map is stored into an R1 source register area of the allocation entry in the reservation station by using this area in common. Further, at a priority stage of the previous instruction, a buffer allocation address of an execution result is compared with a buffer allocation address of the CC information stored in the reservation station, completion of preparation of forward control for the following instruction is notified, thereby allowing the instruction to be executed. Finally, at the updating stage of the previous instruction, the CC data obtained as an execution result of the previous instruction is stored into the reservation station. The instruction cache 12 and the data cache 38 are connected to a memory via a system controller from an interface (not shown) corresponding to an SPARC instruction architecture.

Subsequently, a fundamental processing procedure of the processor according to the invention which executes the dynamic pipeline scheduling will be described with reference to FIGS. 5A and 5B. The instruction fetching unit 10 collectively fetches, for example, four instructions from a queue on the instruction cache 12 side into the four instruction word registers 18-1 to 18-4 in the instruction issuing unit 16 and decodes them. The four decoded instructions are sent to the reservation station processing unit 24. The reservation station processing unit 24 has, for example, the five reservation stations 26-1 to 26-5 and stores the instructions into the reservation stations with empty spaces having a predetermined relation. Each of the reservation stations 26-1 to 26-5 has, for example, eight entries, so that a total of 40 instructions can be reserved. The issue of the instructions to the reservation station processing unit 24 is executed in-order according to order of the program. Simultaneously with that, the instructions are inputted to the reservation stations 26-1 to 26-5, and an entry is allocated to the commit stack entry 42 for every instruction and held until release by a commitment of the instruction. In the embodiment, the commit stack entry 42 has 64 entries. Therefore, no instruction is issued from the instruction word registers 18-1 to 18-4 in the instruction issuing unit 16 if the entry which can be used does not exist in the corresponding reservation stations 26-1 to 26-5 in the reservation station processing unit 24, the commit stack entry 42, and resources (register update buffer, storage buffer, etc.) which are necessary for executing the instructions, but they are stalled at the decoding stage. When all operands of the instructions are prepared in one of the reservation stations 26-1 to 26-5 and the corresponding arithmetic operating unit enters a state where an arithmetic operation can be performed, the instruction executing unit 28 immediately executes the instruction operation and an execution result is obtained. The operations for executing the instructions in the instruction executing unit 28 are not performed in order of the program but are successively and selectively executed out-of-order from the executable instruction. By receiving a discrimination result indicative of establishment of a branch or the like, the instruction is committed and the execution result of the instruction executing unit 28 is stored into the storage buffer 36. After that, if the instruction is a storing instruction, it is stored into the data cache 38 and the instruction is completed in-order. If the instruction is another arithmetic operating instruction, it is further stored into the corresponding register in the general register file 44 and the instruction is completed in-order. When the instruction is committed as mentioned above, the allocation entry in the commit stack entry 42 is released. Since the processor of the invention executes the instruction operation out-of-order in the instruction executing unit 28 and the instructions are not executed in order of the program, a dedicated register to hold information has to be allocated for every instruction. Since, for example, the four instruction word registers 18-1 to 18-4 are prepared for the instruction issuing unit 16, if four dedicated registers cannot be allocated, the instructions cannot be simultaneously stored into the reservation station processing unit 24 but have to be stalled at the decoding stage when the dedicated registers have fully been allocated. The register update buffer 46 is prepared as a dedicated register which is allocated for every instruction. In the embodiment, the register update buffer 46 has, for example, 64 entries.

A register renaming is known as a method whereby the dedicated register is allocated for every instruction and contents in the register are updated in order of the program and referred to. The register renaming will be specifically explained hereinbelow. It is now assumed that the following instructions 1, 2, and 3 exist.

Instruction 1 . . . R1+R2=R3
Instruction 2 . . . R3+R4=R3
Instruction 3 . . . R3+R8=R9

Figure 1:
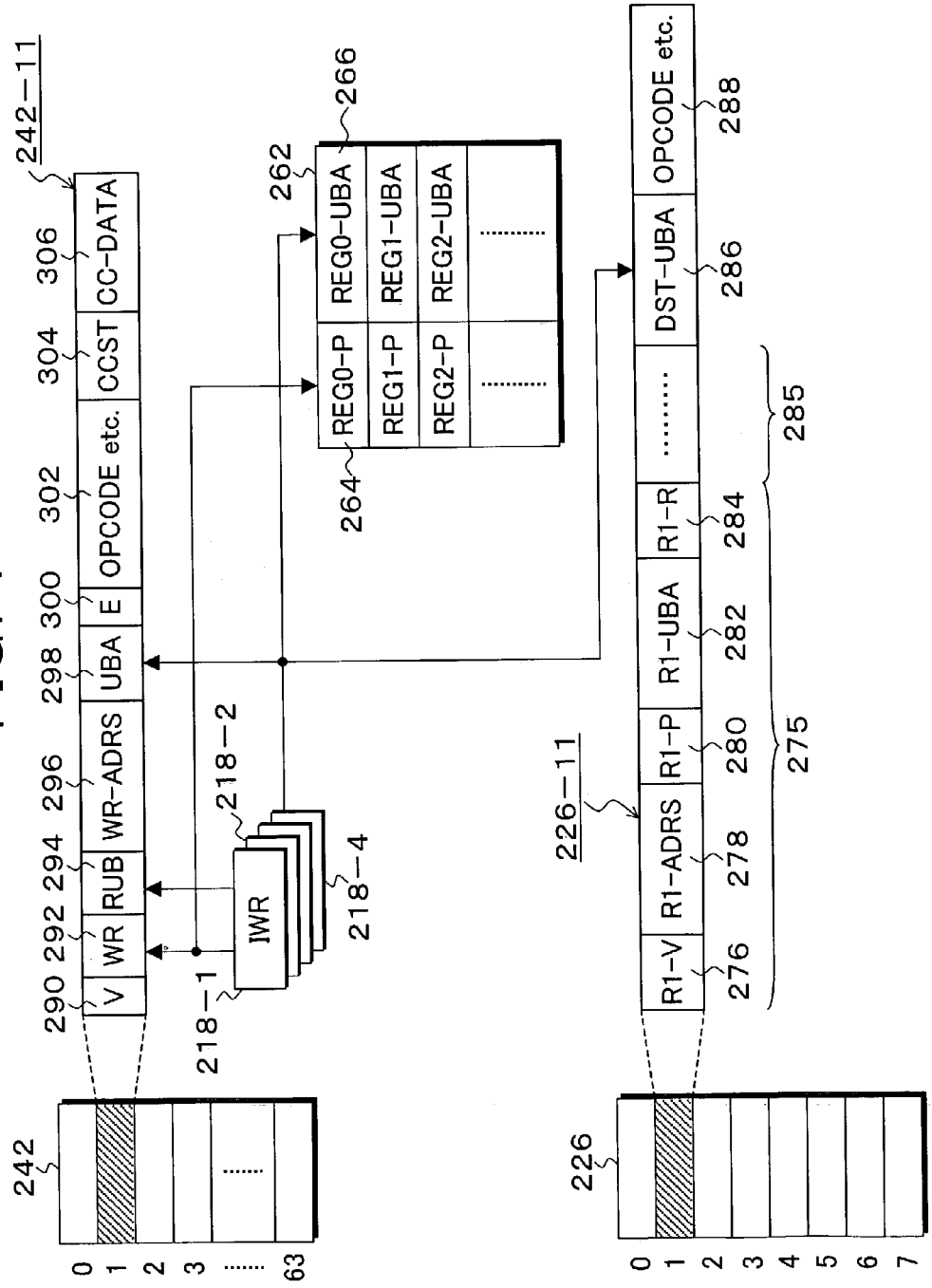
FIG. 1 is an explanatory diagram of a conventional updating process of a renaming map of register data.
Figure 2:
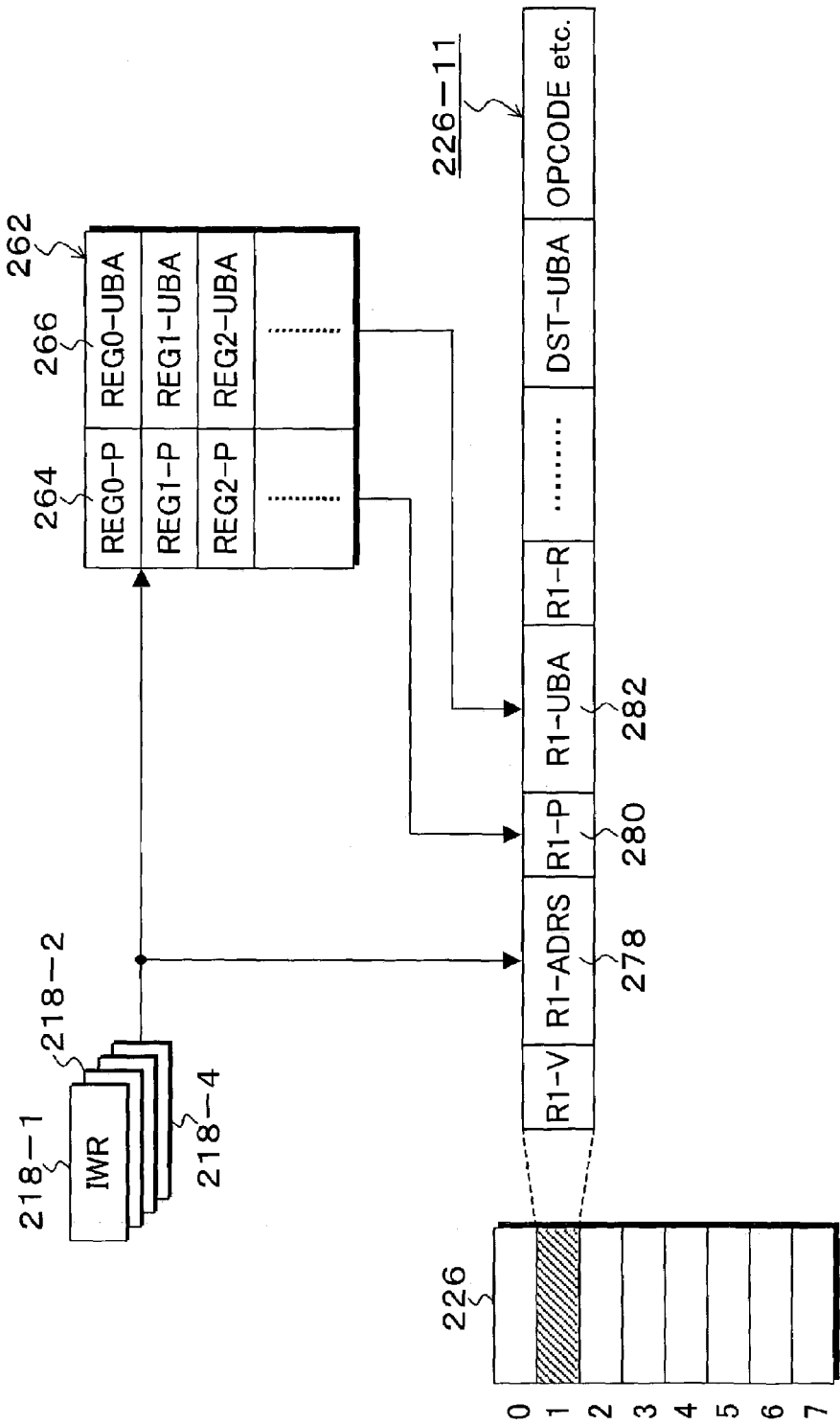
FIG. 2 is an explanatory diagram of a conventional referring process of the renaming map of the register data.
Figure 3:
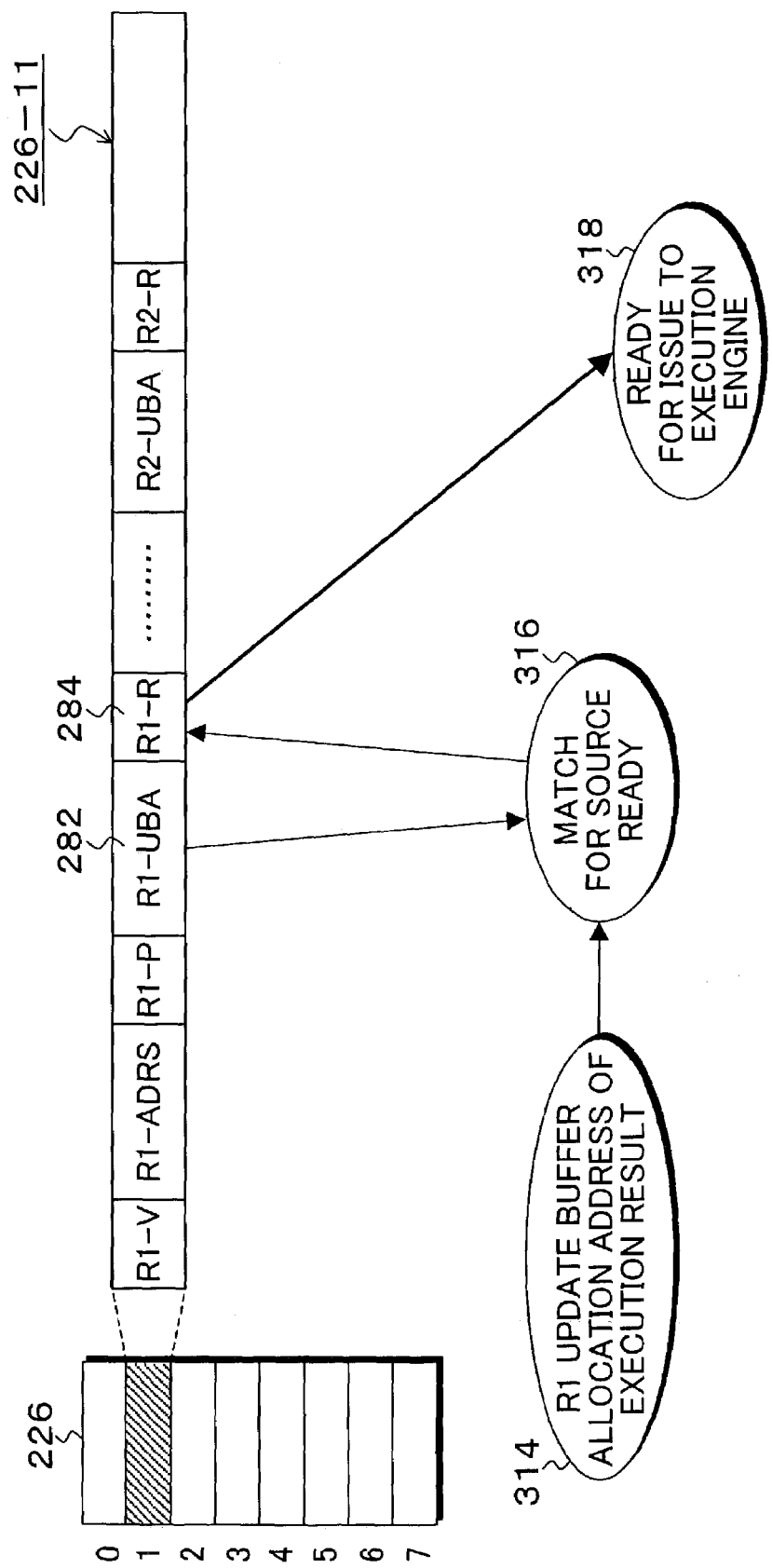
FIG. 3 is an explanatory diagram of a conventional discriminating process of forward control of the register data.
Figure 4:
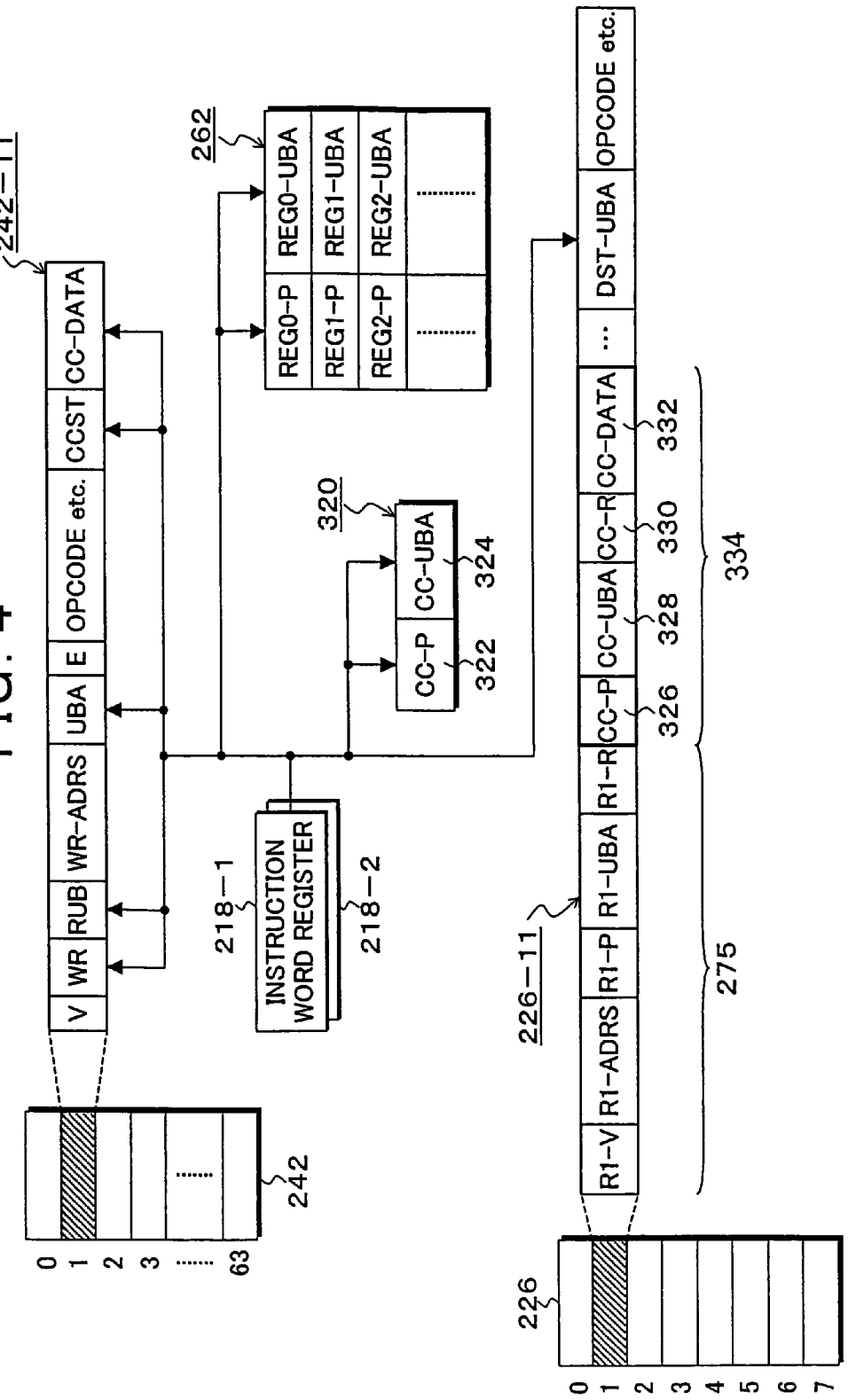
FIG. 4 is an explanatory diagram of a conventional updating process of a CC renaming map.

Among those three instructions 1 to 3, there is a dependent relation between a destination register R3 of the instruction 1 and a first operand register R3 of the instruction 2. There is also a dependent relation between a destination register R3 of the instruction 2 and a first operand register R3 of the instruction 3. In such a case, in the register renaming, for example, the dedicated register is allocated as a renaming register R3*a* to the destination register R3 of the instruction 1 and the first operand register R3 of the instruction 2. A renaming register R3*b* is allocated to the destination register R3 of the instruction 2 and the first operand register R3 of the instruction 3. Use of the renaming register R3*a* allocated upon decoding of the instruction is assured until the instruction 1 is committed. Use of the renaming register R3*b* is assured until the instruction 2 is committed. The register renaming for the ordinary register update instruction is executed by the renaming processing unit in FIGS. 5A and 5B and its details are fundamentally the same as those in FIGS. 1 to 4. In the invention, however, since the source register area is used in common with respect to the storage of the CC information into the reservation station by the CC renaming processing unit 22, the CC source register area 334 which is used only for the CC and added as shown in FIG. 4 is not provided in the reservation station.

Figure 6:
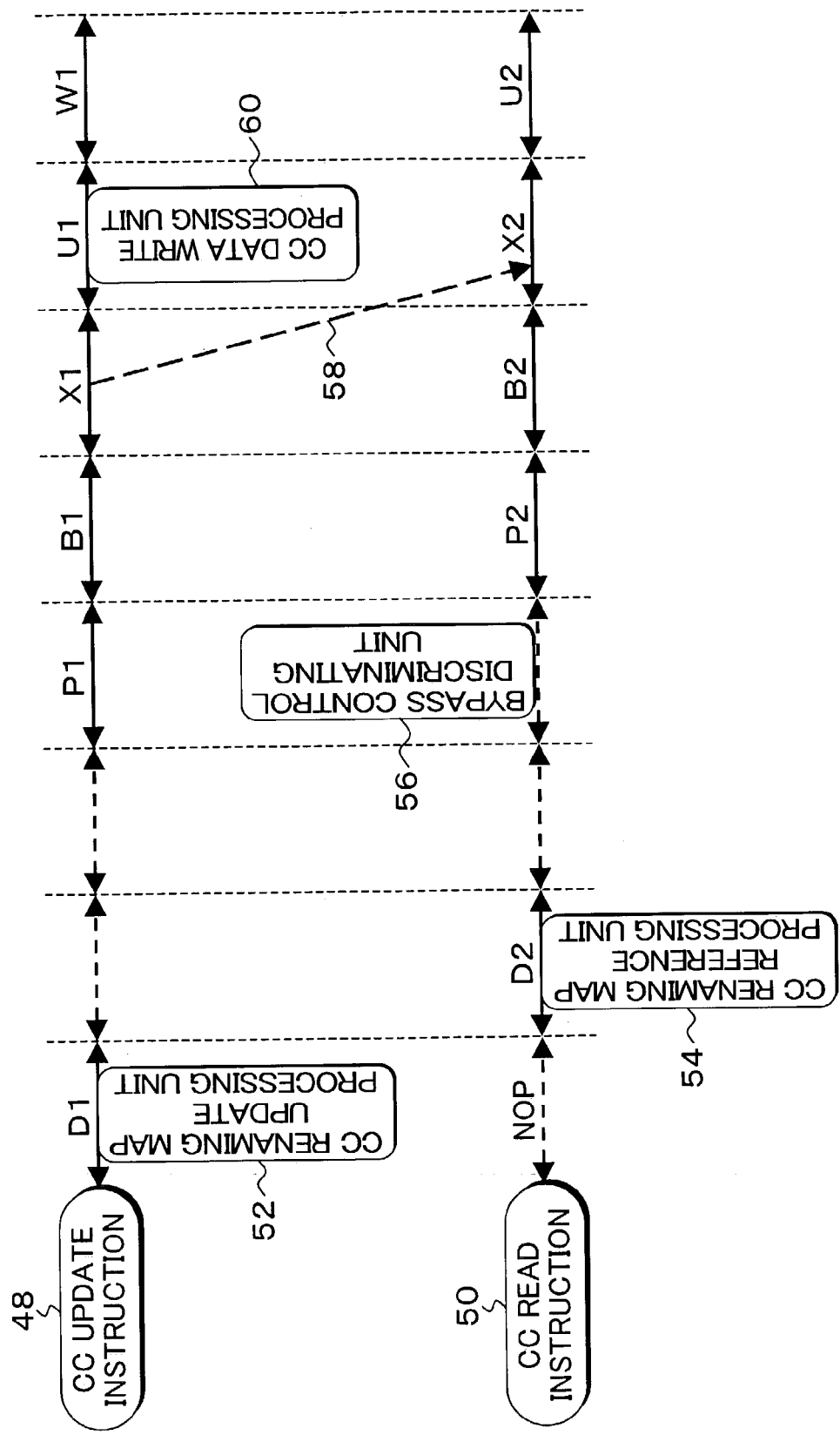
FIG. 6 is an explanatory diagram of a pipeline stage at which a CC data storing process is executed according to the invention.

FIG. 6 is an explanatory diagram of a pipeline stage at which the CC data storing process into the reservation station is executed according to the invention. The storage control of the CC data into the reservation station according to the invention is executed in the case where the instruction fetching unit 10 simultaneously fetches a plurality of instructions including a CC update instruction 48 and a CC read instruction 50 into the instruction word registers 18-1 to 18-4 in the instruction issuing unit 16 and decodes them. The previous CC update instruction 48 sequentially executes processes at a decoding stage D1, a priority stage P1, a buffer stage B1 known as a buffer storing cycle, an executing stage X1, an updating stage U1, and further, a writing stage W1. The two stages after the decoding stage D1 indicate cycles in which no priority is obtained in the reservation station. The following CC read instruction 50 is processed after a delay of one stage due to the multiflow development in order of a decoding stage D2, a priority stage P2, a buffer stage B2, an executing stage X2, an updating stage U2, and further, a writing stage W2 (not shown). The two stages after the decoding stage D2 indicate cycles in which no priority is obtained in the reservation station.

Figure 7A:
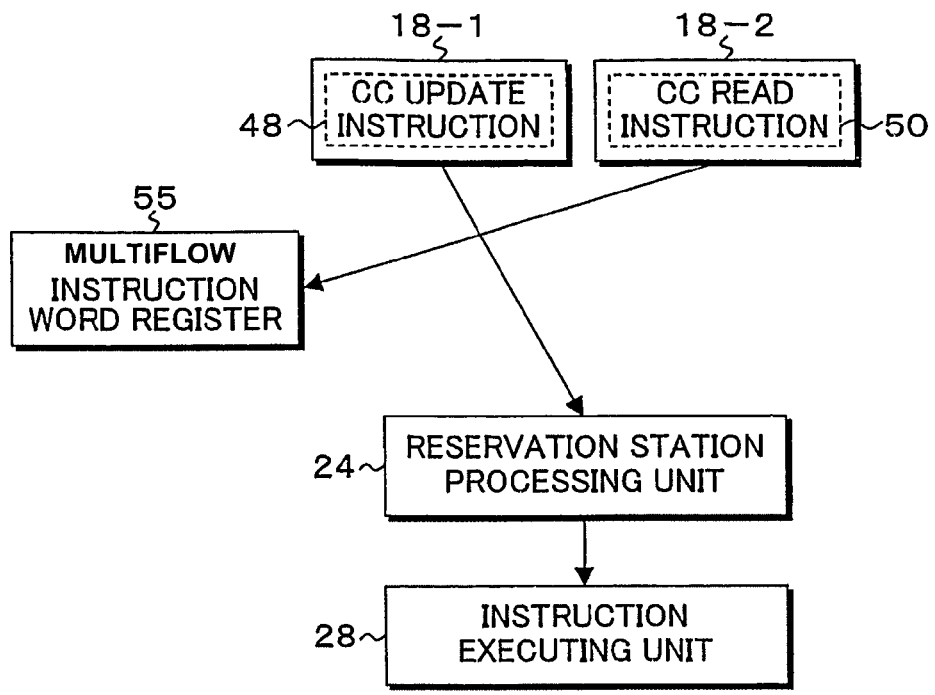
FIGS. 7A and 7B are explanatory diagrams of an instruction operation of a following CC read instruction by the multiflow development for delaying the instruction by one stage in FIG. 6.
Figure 7B:
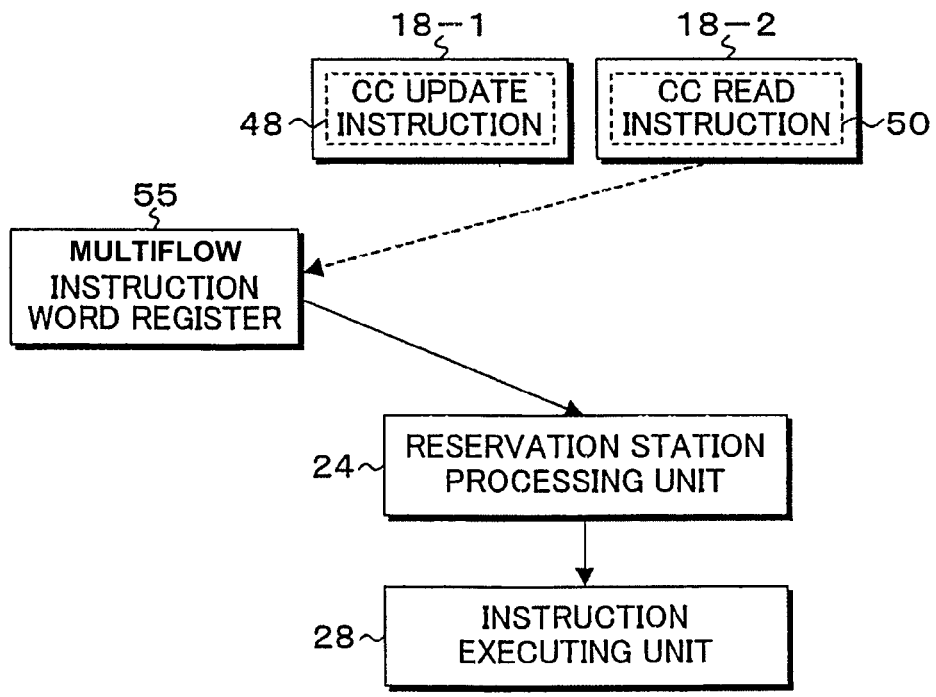

FIGS. 7A and 7B are explanatory diagrams of the instruction operation according to the multiflow development of the following CC read instruction 50. If the previous CC update instruction 48 and the following CC read instruction 50 are now fetched into the instruction word registers 18-1 and 18-2 as shown in FIG. 7A, at the decoding stage D1, the previous CC update instruction 48 is issued to the reservation station processing unit 24. On the other hand, the following CC read instruction 50 is developed into a multiflow. At the first stage, the instruction issue by the decoding is not performed as an NOP (no-operation) but, as an instruction operation of the previous flow (first flow) by the multiflow development, and the CC read instruction 50 is transferred and stored into a multiflow instruction word register 55. Therefore, only a CC renaming map updating process by the decoding of the previous CC update instruction 48 is executed at the first stage. At the next stage, as shown in FIG. 7B, by the instruction operation of the following flow (second flow) which was developed into the multiflow, an operating stage enters the decoding stage D2 of the CC read instruction stored in the multiflow instruction word register 55 and the instruction is issued to the reservation station processing unit 24. At this time, another instruction is not issued. Therefore, only a CC renaming map reading process by the following CC read instruction 50 is executed separately from the decoding of the previous CC update instruction 48.

Referring again to FIG. 6, at the decoding stage D1 of the previous CC update instruction 48, when a CC renaming map updating process unit 52 allocates the CC renaming register which holds the CC register update data until a commitment of the instruction, condition code information including a buffer allocation address (register number) of the CC renaming register is registered into a renaming register map for a condition code. The next stage is the decoding stage D2 of the following CC read instruction 50 developed into the multiflow. A CC renaming map reference processing unit 54 stores the condition code information of the previous instruction registered in the renaming map for the condition code into the source register area of the allocation entry in the reservation station of the previous CC update instruction 48. Further, at the priority stage P1 of the previous CC update instruction 48, a bypass control discriminating unit 56 compares a renaming address number obtained as an execution result of the CC update instruction 48 with a renaming register number stored in the previous instruction allocation entry of the reservation station. When they coincide, the instruction executing unit is notified of completion of the preparation of the forward control, thereby allowing an arithmetic operation result of the previous instruction 48 to be directly forwarded from the executing stage X1 of the previous instruction 48 to an arithmetic operating unit of the instruction executing unit for executing an arithmetic operation at the executing stage X2 of the CC read instruction 50 as shown by an broken arrow 58. Further, at the updating stage U1 of the previous CC update instruction 48, in parallel with the arithmetic operation at the executing stage X2 by the forward control of the following CC read instruction 50, a CC data write processing unit 60 stores the condition code data obtained as an execution result of the previous CC update instruction 48 into the source register area of the previous instruction allocation entry in the reservation station.

FIG. 8 shows details of the process of the CC renaming map update processing unit 52 in FIG. 6. On the basis of the CC update instruction which has been fetched in the instruction word register 18-1 and decoded, with respect to a destination register for storing the execution result of the CC update instruction, it is used as a renaming register, and an empty buffer on the register update buffer 46 in FIGS. 5A and 5B is held as an allocation buffer. A CC renaming map 70 is formed in correspondence to the register update allocation buffer held as a renaming register. A CC update pending bit 72 is set into the CC renaming map 70. At the same time, a CC update buffer allocation address 74 held as a renaming register of the destination register is registered. Simultaneously with it, an allocation entry 42-11 is held in the commit stack entry 42. Further, the CC update instruction which has been fetched in the instruction word register 18-1 and decoded is issued to a reservation station 26, and an allocation entry 26-11 is held. The allocation entry 26-11 in the reservation station 26 has a first source register area 75, a second source register area (not shown), a destination update buffer allocation address 86, and further, an instruction operation 88 such as an OP code or the like. The first source register area 75 has a valid bit 76, an R1 update buffer allocation address 78, an R1 pending bit 80, an R1 update buffer allocation address 82, and an R1 ready bit 84. The allocation entry 42-11 held in the commit stack entry 42 has a valid bit 90, a write register allocation bit 92, a register update buffer allocation bit 94, a write register address 96, an update buffer allocation address 98, an arithmetic operation completion wait bit 100, an instruction operation 102 such as an OP code or the like, a CC register write bit 104, and a CC data area 106. Therefore, by the CC update instruction which has been fetched in the instruction word register 18-1 and decoded, the CC renaming map 70 is prepared and, at the same time, the write register allocation bit 92 of the allocation entry 42-11 held in the commit stack entry 42 is set to 1, the register update buffer allocation bit 94 is set to 1, the update buffer allocation address 98 is set, and the CC register write bit 104 is set. Further, the destination update buffer allocation address 86 is stored into the allocation entry 26-11 held in the reservation station 26.

FIG. 9 shows details of the CC renaming map reference processing unit 54 which operates at the decoding stage D2 of the following CC read instruction 50 in FIG. 6. In the referring process of the CC renaming map 70, by referring to the CC renaming map 70 by the CC read instruction 50 which has been fetched in the instruction word register 182 and decoded by the instruction operation of the following flow due to the multiflow development, the CC update pending bit 72 and CC update buffer allocation address 74 registered by the updating process in FIG. 8 are read out and stored into an area of the R1 pending bit 80 and an area of the R1 update buffer allocation address 82 in the first source register area 75 in the allocation entry 26-11 of the previous instruction held in the reservation station 26, respectively.

FIG. 10 shows details of the process of the bypass control discriminating unit 56 at the priority stage P1 of the previous CC update instruction 48 in FIG. 6. In the process of the bypass control discriminating unit 56, an update buffer allocation address 114 serving as an arithmetic operation result of the CC update instruction 48 is supplied to a matching processing unit 116 at the priority stage P1. A CC update buffer allocation address 110 stored in the allocation entry 26-11 in the reservation station 26 at this time by the referring process is read out and compared. If the coincidence of both addresses is determined by the matching processing unit 116, as shown in the reservation station 26 in FIG. 8, a CC ready bit 112 is set into the area allocated as an R1 ready bit 84 in the first source register area 75. As mentioned above, when the CC ready bit 112 is set into the allocation entry 26-11 in the reservation station 26, on the basis of it, the instruction executing unit which is apt to execute the CC read instruction as a following instruction is notified of completion of the preparation of the forward control in the following instruction using the CC data as an execution result of the previous instruction by issuing the bypass ready to the instruction executing unit as shown in a process 118, thereby allowing the instruction to be executed.

Figure 11:
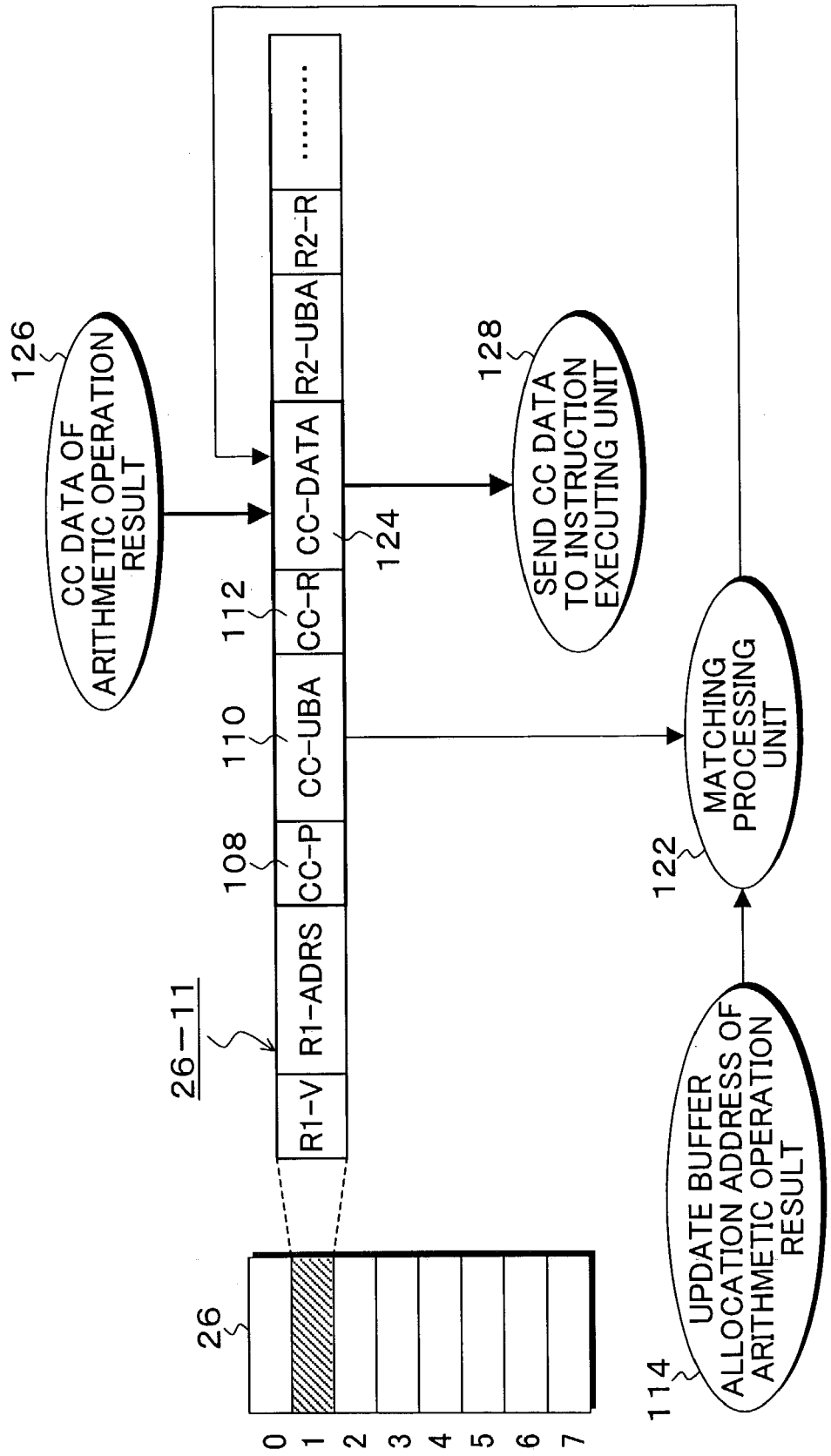
FIG. 11 is an explanatory diagram of a writing process of the CC data into a reservation station according to the invention.

FIG. 11 shows details of the process of the CC data write processing unit 60 at the update stage U1 of the previous CC update instruction 48 in FIG. 6. In a manner similar to the case of the forward control discrimination in FIG. 10, according to the CC data writing process, the update buffer allocation address 114 of the arithmetic operation result obtained as an execution result of the previous instruction is inputted to a matching processing unit 122 and compared with the CC update buffer allocation address 110 stored in the allocation entry 26-11 in the reservation station 26 at this time. If they coincide, CC data 126 of the arithmetic operation result obtained by a data bus is stored into CC (condition code) data 124 by using an area corresponding to a head unit of the second source register area subsequent to the CC ready bit 112 which has already been stored in the allocation entry 26-11 in the reservation station 26. The CC data 124 which is stored in the allocation entry 26-11 allocated to the previous instruction in the reservation station 26 has directly been forwarded to the arithmetic operating unit for executing the following CC read instruction at the executing stage X1 of the CC update instruction 48 in FIG. 6. By using this CC data, the arithmetic operation of the following CC read instruction 50 is executed at the executing stage X2. By developing the following instruction into the multiflow so that the CC renaming does not overlap and sequentially decoding it as mentioned above, even if the number of stages is increased by the multiflow development, since a frequency of generation of the CC update instruction 48 and the CC read instruction 50 is low, an influence on the whole performance of the processor is small. Even if the register update buffer 46 in FIGS. 5A and 5B which is used for the renaming of the ordinary register is allocated for the purpose of CC renaming, a situation that the buffer lacks and the instructions are stalled at the decoding stage is not caused. Rather than that, by using the resources of the ordinary register renaming in common for the renaming of the CC register, an increase in resources is prevented. Particularly, since the simultaneous CC renaming of the CC update instruction and the CC read instruction can be avoided, an operating frequency of the processor can be raised.

As mentioned above, according to the invention, in the processor which simultaneously decodes a plurality of instructions, the CC read instruction which needs to be renamed is developed into the multiflow in consideration of the dependent relation with the instruction before the self instruction in the CC update instruction and the CC read instruction which were simultaneously decoded. The first flow which can be issued simultaneously with the previous CC update instruction is set to no-operation and stored into the multiflow instruction word register. In the next second flow in which another instruction is not simultaneously issued, the CC read instruction in the multiflow instruction word register is decoded, the renaming map for CC reading is referred to, and the simultaneous CC renaming is avoided, thereby enabling the operating frequency of the processor to be raised.

Although the number of stages is increased by the multiflow development, since the frequency of generation of the CC update instruction and the CC read instruction which are simultaneously decoded is low, the influence on the whole performance of the processor is so small that it can be ignored. Rather than that, a large advantage such that the operating frequency of the processor can be raised is obtained.

The CC dedicated area is not provided in the allocation entry of the reservation station but the ordinary register operand area is used in common. The update pending bit, the buffer allocation address, and further, the CC data in the CC renaming register are stored as CC information into the register operand area, thereby suppressing the resources necessary for the CC update instruction of a lower frequency than that of the ordinary register update instruction to a necessary minimum amount.

Further, with respect to the priority stage of discriminating the forward control of the CC data as well, by using the conditions of the ordinary register update in common without adding conditions only for use of the CC data, the resources can be saved.

The invention is not the foregoing embodiment but incorporates many proper modifications without losing the objects and advantages of the invention. The invention is not limited by the numerical values shown in the embodiment.

What is claimed is:

1. A processor comprising:
an instruction issuing unit which issues fetched and decoded instructions to a reservation station in-order;
an instruction executing unit which executes out-of-order the instructions issued to said reservation station;
a committing unit which discriminates a commitment of the instructions executed by said instruction executing unit and completes them in-order;
an instruction fetching unit which simultaneously fetches a plurality of instructions including a condition code update instruction and a condition code read instruction into said instruction issuing unit;
a renaming map update processing unit which, at a decoding stage of said condition code update instruction, when a renaming register which holds condition code update data until the commitment of the condition code update instruction is allocated, registers condition code information including a register number of said renaming register into a renaming map for a condition code;

a renaming map reference processing unit which develops said condition code read instruction into a multiflow instruction, transfers and holds the multiflow instruction into a multiflow instruction word register at a decoding stage of the condition code read instruction after no-operation has been performed by the condition code read instruction during the decoding stage of the condition code update instruction, and stores the condition code information of the condition code update instruction registered in said renaming map for the condition code into a source register area of a previous instruction allocation entry stored in said reservation station;

a forward control discriminating unit which, at a priority stage of said condition code update instruction, compares a renaming register number of an execution result with a renaming register number in the previous instruction allocation entry in said reservation station and, when they coincide, notifies said instruction executing unit of completion of preparation for forward control of condition data for the condition code read instruction and allows said instruction executing unit to execute the condition code read instruction thereby avoiding simultaneous renaming of said condition code by both said condition code update instruction and said condition code read instruction; and a condition data write processing unit which, at an updating stage of said condition code update instruction, stores condition code data obtained as an execution result of the condition code update instruction into the source register area of the previous instruction allocation entry stored in said reservation station.

2. A processor according to claim 1, wherein said renaming map update processing unit stores an update pending bit into said renaming map for the condition code together with the register number of the renaming register allocated to said condition code update instruction.

3. A processor according to claim 2, wherein said renaming map reference processing unit stores the update pending bit of the condition code update instruction registered in said renaming map for the condition code and a register number of the renaming register for the condition code into an area for the update pending bit of the source register in the previous instruction allocation entry of said reservation station and the renaming register number.

4. A processor according to claim 3, wherein said forward control discriminating unit compares a renaming address number of the execution result of the condition code update instruction with the renaming register number in the previous instruction allocation entry in said reservation station under a condition that said update pending bit has been set to 1, when they coincide, sets a bypass ready bit for the condition code into a bypass ready area of the source register in the previous instruction allocation entry in said reservation station, and notifies the instruction executing unit of the completion of the preparation for the forward control of the condition data for the condition code read instruction on the basis of the bypass ready bit for the condition code.

5. A processor according to claim 4, wherein said condition data write processing unit stores the condition data obtained as an arithmetic operation result of the condition code update instruction into an area of the source register subsequent to the condition code update pending bit, an address number of the renaming register for the condition code, and the bypass ready bit for the condition code in the previous instruction allocation entry stored in said reservation station.

6. An instruction control method of a processor, comprising:
- an instruction issuing step wherein instructions which were fetched and decoded are issued to a reservation station in-order;
- an instruction executing step wherein the instructions issued to said reservation station are executed out-of-order;
- a committing step wherein a commitment of the instructions executed in said instruction executing step is discriminated and the instructions are completed in-order;
- an instruction fetching step wherein a plurality of instructions including a condition code update instruction and a condition code read instruction are simultaneously fetched into an instruction issuing unit;
- a renaming map updating step wherein at a decoding stage of said condition code update instruction, when a renaming register which holds update data until the commitment of the condition code update instruction is allocated, condition code information including a register number of a renaming register is registered into a renaming map for a condition code;
- a renaming map referring step wherein said condition code read instruction is developed into a multiflow instruction, the multiflow instruction is transferred and held into a multiflow instruction word register at a decoding stage of the condition code read instruction after no-operation has been performed by the condition code read instruction during the decoding stage of the condition code update instruction, and condition code information of the condition code update instruction registered in said renaming map for the condition code is stored into a source register area in a previous instruction allocation entry stored in said reservation station;
- a forward control discriminating step wherein at a priority stage of said condition code update instruction, a renaming address number of an execution result is compared with a renaming register number in the previous instruction allocation entry in said reservation station, and when they coincide, an instruction executing unit is notified of completion of preparation of forward control of condition data for the condition code read instruction and is allowed to execute the condition code read instruction thereby avoiding simultaneous renaming of said condition code by both said condition code update instruction and said condition code read instruction; and
- a condition data writing step wherein at an update stage of the condition code update instruction, condition code data obtained as an execution result of the condition code update instruction is stored into the source register area in the previous instruction allocation entry stored in said reservation station.

7. A method according to claim 6, wherein in said renaming map updating step, an update pending bit is stored into said renaming map for the condition code together with the register number of the renaming register allocated to said condition code update instruction.

8. A method according to claim 7, wherein in said renaming map referring step, an update pending bit of the condition code update instruction registered in said renaming map for the condition code and a register number of the renaming register for the condition code are stored into an area for the update pending bit of the source register in the previous instruction allocation entry of said reservation station and the renaming register number.

9. A method according to claim 8, wherein in said forward control discriminating step, the renaming address number of the execution result of the condition code update instruction is compared with the renaming register number in the previous instruction allocation entry in said reservation station under a condition that said update pending bit has been set to 1, when they coincide, a bypass ready bit for the condition code is set into a bypass ready area of the source register in the previous instruction allocation entry in said reservation station, and the instruction executing unit is notified of the completion of the preparation for the forward control of the condition data for the condition code read instruction on the basis of the bypass ready bit for the condition code.

10. A method according to claim 9, wherein in said condition data writing step, the condition data obtained as an arithmetic operation result of the condition code update instruction is stored into a source register area subsequent to the condition code update pending bit, the address number of the renaming register for the condition code, and the bypass ready bit for the condition code in the previous instruction allocation entry stored in said reservation station.

11. A processor in which a plurality of instructions including a condition code update instruction and a condition code read instruction are simultaneously fetched, comprising:
- a renaming map update processing unit which registers condition code information including a register number of a renaming register into a renaming map for a condition code at a decoding stage of said condition code update instruction, when the renaming register which holds update data until a commitment of the condition code update instruction is allocated;
- a renaming map reference processing unit which develops said condition code read instruction into a multiflow instruction, transfers and holds the multiflow instruction into a multiflow instruction word register at a decoding stage of the condition code read instruction after no-operation has been performed by the condition code read instruction during the decoding stage of the condition code update instruction, and stores the condition code information of the condition code update instruction registered in said renaming map for the condition code into a source register area of a previous instruction allocation entry stored in a reservation station;
- a forward control discriminating unit which, at a priority stage of said condition code update instruction, compares a renaming register number of an execution result with a renaming register number in the previous instruction allocation entry in said reservation station and, when they coincide, notifies said instruction executing unit of completion of preparation for forward control of condition data for the condition code read instruction and allows said instruction executing unit to execute the condition code read instruction thereby avoiding simultaneous renaming of said condition code by both said condition code update instruction and said condition code read; and
- a condition data write processing unit which, at an updating stage of said condition code update instruction, stores condition code data obtained from execution of the condition code update instruction into the source register area of the previous instruction allocation entry stored in said reservation station.

12. An instruction control method of a processor in which a plurality of instructions including a condition code update instruction and a condition code read instruction, are simultaneously fetched, comprising:

renaming map updating in which condition code information including a register number of a renaming register, is registered into a renaming map for a condition code at a decoding stage of said condition code update instruction, when the renaming register which holds update data until a commitment of said condition code update instruction is allocated;

renaming map referring in which said condition code read instruction is developed into a multiflow instruction, the multiflow instruction is transferred and held into a multiflow instruction word register, no-operation being performed by the condition code read instruction during the decoding stage of said condition code update instruction, and the condition code information of the condition code update instruction registered in said renaming map for the condition code is stored into a source register area in a previous instruction allocation entry stored in a reservation station at a decoding stage of the condition code read instruction;

forward control discriminating in which, at a priority stage of said condition code update instruction, a renaming address number of an execution result is compared with a renaming register number in the previous instruction allocation entry in said reservation station, and when they coincide, an instruction executing unit is notified of completion of preparation of forward control of condition data for the condition code read instruction and is allowed to execute the condition code read instruction thereby avoiding simultaneous renaming of said condition code by both said condition code update instruction and said condition code read instruction; and condition data writing, at an update stage of the condition code update instruction, condition code data obtained from executing the condition code update instruction into the source register area in the previous instruction allocation entry stored in said reservation station.

* * * * *

UNITED STATES PATENT AND TRADEMARK OFFICE
CERTIFICATE OF CORRECTION

PATENT NO. : 7,269,716 B2
APPLICATION NO. : 10/347359
DATED : September 11, 2007
INVENTOR(S) : Toshio Yoshida It is certified that error appears in the above-identified patent and that said Letters Patent is hereby corrected as shown below:

Column 16, Line 63, Claim 11, change "read;" to --read instruction;--.

Signed and Sealed this

Twenty-ninth Day of April, 2008

JON W. DUDAS
*Director of the United States Patent and Trademark Office*